United States Patent
Rosmeulen

(10) Patent No.: US 11,367,251 B2
(45) Date of Patent: Jun. 21, 2022

(54) DEVICE USING LOCAL DEPTH INFORMATION TO GENERATE AN AUGMENTED REALITY IMAGE

(71) Applicant: IMEC vzw, Leuven (BE)

(72) Inventor: Maarten Rosmeulen, Ghent (BE)

(73) Assignee: IMEC vzw, Leuven (BE)

( * ) Notice: Subject to any disclaimer, the term of this patent is extended or adjusted under 35 U.S.C. 154(b) by 0 days.

(21) Appl. No.: 16/909,831

(22) Filed: Jun. 23, 2020

(65) Prior Publication Data
US 2020/0402296 A1 Dec. 24, 2020

(30) Foreign Application Priority Data

Jun. 24, 2019 (EP) .................................... 19182040

(51) Int. Cl.
| | |
|---|---|
| G06T 15/40 | (2011.01) |
| G06T 7/50 | (2017.01) |
| G06T 1/20 | (2006.01) |
| G06T 15/20 | (2011.01) |
| G06T 19/00 | (2011.01) |
| G06V 20/20 | (2022.01) |

(52) U.S. Cl.
CPC ............... *G06T 15/40* (2013.01); *G06T 1/20* (2013.01); *G06T 7/50* (2017.01); *G06T 15/20* (2013.01); *G06T 19/006* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 2012/0200667 A1* | 8/2012 | Gay | H04N 5/272 348/43 |
| 2015/0160340 A1 | 6/2015 | Grauer et al. | |
| 2015/0279103 A1* | 10/2015 | Naegle | G01S 13/0209 345/633 |
| 2017/0180713 A1* | 6/2017 | Trail | H04N 13/296 |
| 2018/0284885 A1* | 10/2018 | Kim | G06F 3/011 |
| 2018/0300952 A1* | 10/2018 | Evans | G06F 9/453 |
| 2019/0356705 A1* | 11/2019 | Escudero | H04L 65/1059 |
| 2020/0242813 A1* | 7/2020 | Nishikawa | G06T 7/70 |
| 2020/0402296 A1* | 12/2020 | Rosmeulen | G06K 9/00671 |

FOREIGN PATENT DOCUMENTS

WO   WO 2017/106053 A1   6/2017

OTHER PUBLICATIONS

Suyang Dong et al: "Resolving Incorrect Visual Occlusion in Outdoor Augmented Reality Using TOF Camera and OpenGL Frame Buffer" XP055245057 dated Nov. 4, 2010.
Extended European Search Report dated Oct. 17, 2019 in counterpart Application No. EP 19182040.6.

* cited by examiner

*Primary Examiner* — Patrick F Valdez
(74) *Attorney, Agent, or Firm* — Knobbe Martens Olson & Bear, LLP

(57) ABSTRACT

The disclosed technology presents a device and a method, respectively, for generating an augmented reality (AR) image (or AR video). The device configures to obtain a first image of a scene, obtain a second image of an object, obtain a depth range, and capture a third image of only the parts of the scene inside the depth range. Further, the device configures to generate occlusion information based on the third image, and overlay the first image and the second image based on the occlusion information to generate the AR image.

20 Claims, 3 Drawing Sheets

DEVICE USING LOCAL DEPTH INFORMATION TO GENERATE AN AUGMENTED REALITY IMAGE

CROSS-REFERENCE TO RELATED APPLICATIONS

This application claims foreign priority to EP 19182040.6 filed Jun. 24, 2019 and titled "DEVICE FOR GENERATING AN AUGMENTED REALITY IMAGE", the content of which is incorporated by reference herein in its entirety.

BACKGROUND OF THE INVENTION

Technological Field

The disclosed technology relates to the technical field of augmented reality (AR). In particular, the disclosed technology presents a device and a method, respectively, for generating an AR image (or AR video) based on input images (or videos). The AR image is specifically generated based on an image of a scene and an image of an object, and considering what parts of the scene are occluded by the object and/or occlude the object, respectively.

Description of the Related Technology

Digital photography and videography are widely used and are available in various formats and included in image recording devices such as mobile phones, digital still cameras, and video cameras. The traditional purpose of these image recording devices is to record images with the highest possible fidelity. A new trend, however, is to modify the recoded image with additional visual content that was not present in an original image. This technique of augmenting a recorded image with additional visual content, i.e. with another image, and subsequently displaying the modified image to a viewer, is generally referred to as AR.

A device that produces an AR image requires depth information to augment or overlay the original image with the additional visual content. The depth information provides the device with knowledge about the distance relationship between the observer and different parts of the original image, which is essential for rendering a realistic AR experience.

In a conventional AR device, a depth map imaging unit may thus be provided along with a main camera. This allows overlaying the original image obtained with the main camera with depth information at each point of the original image, based on the information provided by the depth mapping unit.

Unfortunately, the performance of existing depth mapping units is not sufficient to achieve satisfactory results. The available depth mapping units provide insufficient resolution, depth range, depth accuracy, frame rate, compactness, ruggedness, cost, or power efficiency, and mostly fall short on multiple of these items at the same time. In particular, the registration of high resolution ("XY" plane, "Z" direction, "t" in terms of frames for a video) depth maps is a big challenge, which can only be achieved with considerable effort, i.e. significant cost, power consumption, and volume of the AR device.

Therefore, alternative ways for achieving satisfactory AR rendering are required.

SUMMARY OF CERTAIN INVENTIVE ASPECTS

In view of the above-mentioned challenges and disadvantages of the conventional techniques, embodiments of the disclosed technology aim to provide an improved device for generating an AR image (or AR video).

The crucial task to be performed when rendering an AR image is the placement of an image of a virtual object (e.g., a figurine to be added to or replacing the background of) an original image (still image or video frame). A key task is determining which parts of the scene of the original image that should be shaded (occluded) by the virtual object, and vice versa, i.e., which parts of the original image will overlap the virtual object. This task is generally referred to as determining occlusion.

An objective is to provide a device that achieves satisfactory AR image rendering, in particular that handles occlusion, but that does not require a high-performance depth mapping unit. Accordingly, a simpler way for realizing AR image generation is desired. The occlusion should be handled by the device efficiently, without requiring increased cost, power, and/or volume.

The objective is achieved by the embodiments of the disclosed technology provided in the enclosed independent claims. Advantageous implementations of these embodiments are defined in the dependent claims.

A first aspect of the disclosed technology provides a device for generating an AR image, the device being configured to: obtain a first image of a scene, obtain a second image of an object, obtain a depth range, capture a third image of only the parts of the scene inside the depth range, generate occlusion information based on the third image, and overlay the first image and the second image based on the occlusion information, in order to generate the AR image.

The "first image", "second image" and "third image" are named like this without implying any order, but solely to distinguish the different images. That means, the device of the first aspect is configured to overlay the image of the scene and the image of the object based on the occlusion information, in order to generate the AR image.

The device does not need a depth mapping unit to provide an accurate measurement of the distance between observer and an object in the AR image at every point of the scene, and e.g. for every frame in a video stream. Thus, the device requires lower cost, power, and volume.

The full depth information is not necessary. Once the device of the first aspect obtains the depth range (e.g. at which the object will appear in the final AR image), the device may determine which parts of the first image are located either in front of or behind that depth range. This is a much easier task than obtaining full depth information, and can be well achieved at high resolution, high frame rate and good power efficiency, e.g., by using various image sensing techniques.

Notably, there are different options for implementing the "second image" and the "object" of the second image, respectively, according to embodiments of the disclosed technology.

For instance, the "second image" may be a picture of the same resolution as the first image. In this case, for each pixel of the first image, the device may be configured to determine whether the pixel needs to be replaced by the equivalent pixel of the second image or not in the AR image using the occlusion information. In this case, the "second image" includes pixels associated with the "object", i.e., there is not a separate object picture. In this case, the device may be considered to perform a simple background swap application.

The "second image" may also be a picture of the same resolution as the first image, in which pixels are marked "opaque" or "transparent" (in particular, the pixels other than the pixels associated with the "object" are marked "transparent"). When overlaying the second image and the first image, the device may in this case be configured to first determine, for each pixel of the first image, if the pixel must be rendered in the AR image because it is in front. Further, the device may also be configured to determine if the pixel needs to be rendered in the AR image because the corresponding pixel of the second image is labeled "transparent". This approach automatically provides means to position the object laterally (XY) with respect to the first image.

Alternatively, the device could only obtain pixels (and their location relative to each other and/or relative to the pixels of the first image) that make up an "object", i.e., there is a picture of the object. In this case, there is not really a "second image" in addition to the object picture, nor are there any "transparent" pixels. The "second image" in this case can be a lateral XY positioning reference frame defined relative to the first image.

In the following disclosure, "second image" and "object" are used without further distinction. To sum up, the second image can be one of the following:

The "second image" is a full picture, which includes pixels that are associated with the "object"

The "second image" is a full picture, which includes pixels marked either "opaque" or "transparent" (the "object" is associated with the "opaque" pixels)

The "second image" is a reference frame, and the "object" is a picture.

In an implementation, the device is configured to, in order to generate the AR image: position the object of the second image in the scene of the first image, wherein parts of the scene are occluded by the object and/or the object is occluded by parts of the scene, according to the occlusion information.

That means, in the final AR image, the object will appear to be located within the scene inside the depth range. The "depth range" in this disclosure may be a determined depth, which relates to a certain distance of an observer to the object, or may include multiple depths. That is, the depth range may be a determined depth (then the "range" is just one number), or a real range (then there may be two numbers, i.e. from here to there), or may include the multiple depths (i.e. may contain more than two numbers denoting depth contained in the depth range). The rendering of the AR image is achieved based on the occlusion relationship between the object of the second image and objects of/in the scene of the first image, as determined by the occlusion information.

Generally, the occlusion information can be or include an occlusion map. For instance, for each pixel of the first image, the occlusion map may indicate whether that pixel is behind the depth range, in front of the depth range, or in the depth range. Thus, the occlusion map may indicate which pixels in the first image are in front of or behind pixels in the second image, and so forth.

In an implementation of the device, the occlusion information is a binary occlusion map.

In this way, the occlusion information can be provided at high resolution with little data. The binary occlusion map may, for instance, indicated for each pixel whether the pixel is in front of/behind the depth range or inside the depth range.

In an implementation of the device, the occlusion map has the same pixel resolution as the third image.

Thus, the device is able to generate high resolution AR images.

In an implementation of the device, the occlusion information identifies the parts of the first image that show the scene behind the depth range, and the parts of the first image that show the scene in front of the depth range.

In an implementation of the device, the occlusion information identifies the parts of the first image that are to be replaced by the second image when overlaying the first image and the second image, in order to generate the AR image.

In an implementation of the device, the third image and/or the occlusion map has a field of view that is substantially the same as the field of view of the first image.

Accordingly, the device is able to generate a realistic AR image.

In an implementation, the device comprises an imaging device configured to capture the first image and the third image.

In an implementation, the device comprises a distance imaging unit configured to capture the third image. The distance imaging unit may be part of the imaging device.

In an implementation, the device comprises a range gated imager configured to capture the third image.

The range gated imager may be part of the imaging device and/or distance imaging unit. For example, the range gated imager may be configured to: send a light pulse onto the scene, synchronize a shutter, which may, for example, be arranged in front of an image sensor, based on an expected return time of light reflected from the parts of the scene inside the depth range, and detect the light that passes the shutter with the image sensor, in order to capture the third image.

With a range gated imager, the required depth information for generating the occlusion information can be efficiently obtained with good accuracy.

In an implementation, the device is further configured to display the generated AR image.

In an implementation of the device, the first image is a frame of a video, and the AR image is a frame of an AR video.

A second aspect of the disclosed technology provides a method of generating an augmented reality (AR) image, the method comprising: obtaining a first image of a scene, obtaining a second image of an object, obtaining a depth range, capturing a third image of only the parts of the scene inside the depth range, generating occlusion information based on the third image, and overlaying the first image and the second image based on the occlusion information, in order to generate the AR image.

In an implementation, the method comprises, in order to generate the AR image: positioning the object of the second image in the scene of the first image, wherein parts of the scene are occluded by the object and/or the object is occluded by parts of the scene, according to the occlusion information.

In an implementation of the method, the occlusion information is a binary occlusion map.

In an implementation of the method, the occlusion map has the same pixel resolution as the third image.

In an implementation of the method, the occlusion information identifies the parts of the first image that show the scene behind the depth range, and the parts of the first image that show the scene in front of the depth range.

In an implementation of the method, the occlusion information identifies the parts of the first image that are to be replaced by the second image when overlaying the first image and the second image, in order to generate the AR image.

In an implementation of the method, the third image and/or the occlusion map has a field of view that is substantially the same as the field of view of the first image.

In an implementation, the method comprises capturing the first image and the third image.

In an implementation, the method comprises using a range gated imager to capture the third image.

In an implementation, the method further comprises displaying the generated AR image.

In an implementation of the method, the first image is a frame of a video, and the AR image is a frame of an AR video.

The method of the second aspect and its implementations achieve the same advantages and effects as described above for the device of the first aspect and its respective implementations.

A third aspect of the disclosed technology provides a computer program product comprising a program code for carrying out, when implemented on an imaging device, the method according to the second aspect or any of its implementation forms.

BRIEF DESCRIPTION OF THE DRAWINGS

The above described aspects and implementations are explained in the following description of embodiments with respect to the enclosed drawings.

DETAILED DESCRIPTION OF CERTAIN ILLUSTRATIVE EMBODIMENTS

Figure 1:
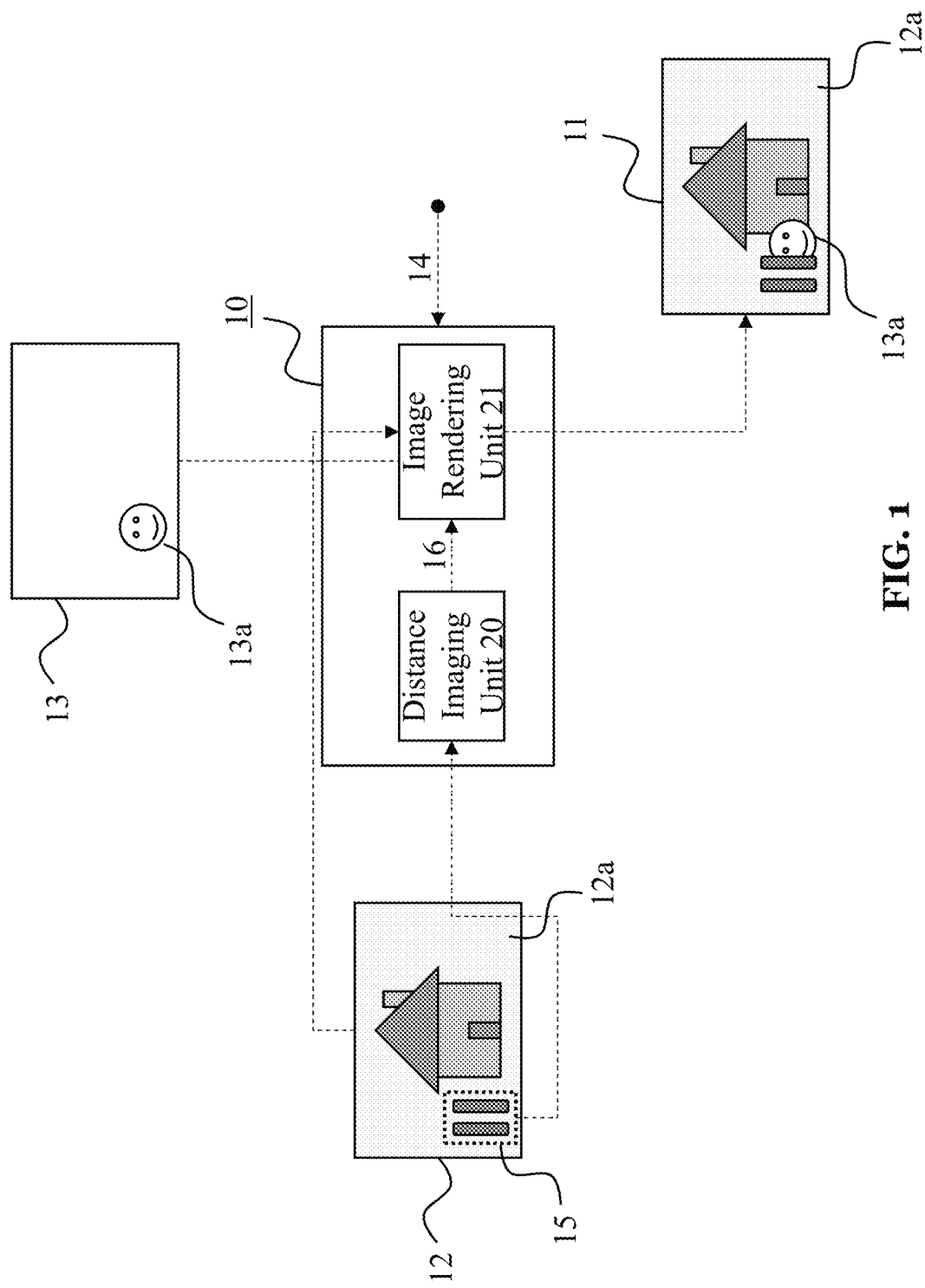
FIG. 1 shows a device according to an embodiment of the disclosed technology.

FIG. 1 shows a device 10 according to an embodiment of the disclosed technology. In particular, the device 10 is configured to generate an AR image 11. Specifically, the device 10 overlays different images of one or more scenes and/or objects to generate the AR image 11. The AR image 11 is a still image or may be a frame of an AR video.

The device 10 is configured to obtain a first image 12 of a scene 12a, and to obtain a second image 13 of an object 13a. The images 12 and 13 may have the same pixel resolution. The device 10 may be capable to capture the first image 12 and/or the second image 13 by means of e.g. an imaging unit, like one or more cameras.

The device 10 is further configured to obtain a depth range 14, for example, at least one or one or more depth values, and to capture a third image 15 of only the parts of the scene 12a inside the depth range 14. The device 10 may capture the third image 15 by means of a distance imaging unit. In particular, the device 10 may comprise a range gated imager for capturing the third image 15.

The device 10 is further configured to generate occlusion information 16 based on the third image 15. For instance, the occlusion information 16 may be an occlusion map, having a pixel resolution of the third image 15. For instance, the occlusion information 16 can be a binary occlusion map. The occlusion information 16 may provide information regarding an occlusion relationship between the scene 12a of the first image 12 and the object 13a of the second image 13. For instance, it may define parts of the scene 12a, which are occluded by the object 13a, and/or it may define parts of the scene 12a, which occlude the object 13a, when the object 13a of the second image 13 is arranged in the scene 12a of the first image 12 to form the AR image 11.

The device 10 is further configured to overlay the first image 12 and the second image 13 based on the occlusion information 16, to generate the AR image 11. Thereby, according to the occlusion information 16, parts of the first image 12 are replaced by the second image 13. Further, according to the occlusion information 16, parts of the second image 13, particularly pixels of the object 13, may be replaced by pixels of the first image 12 (as illustrated in FIG. 1).

For generating the AR image 11, it is necessary for the device 10 to know a priori information regarding the distance relative to the observer, at which the virtual object 13a is to be placed, before an occlusion determination can be carried out. The origin of this a priori placement distance information is dependent on the specific AR application and is outside the scope of this disclosure. This distance information correlates to the depth range 14 that is obtained by the device 10. The depth range 14 may, for example, be provided to the device 10 by a content supplier of the first image 12 and/or second image 13.

The depth range 14 corresponds to the virtual object 13a placement in the depth extent of the scene 12a. The device 10 may further be configured to obtain the virtual object 13a placement in the lateral extent of the scene 12a, i.e., it may obtain the vertical/horizontal position, at which the object 13a of the second image 13 should appear in the scene 12a of the first image 12. Once the virtual object placement in both the depth and lateral extent is obtained by the device 10, the device 10 can determine which part of the scene 12a of the first image 12 is either in front of, or behind the object 13a in the AR image 11, at the location where the virtual object 13a of the second image 13 is to be inserted into the scene 12a of the first image 12. In order to obtain a good AR experience, the occlusion should be determined by the device 10 at high resolution and a high video frame rate (in case that the AR image 11 is a frame of an AR video).

Figure 2:
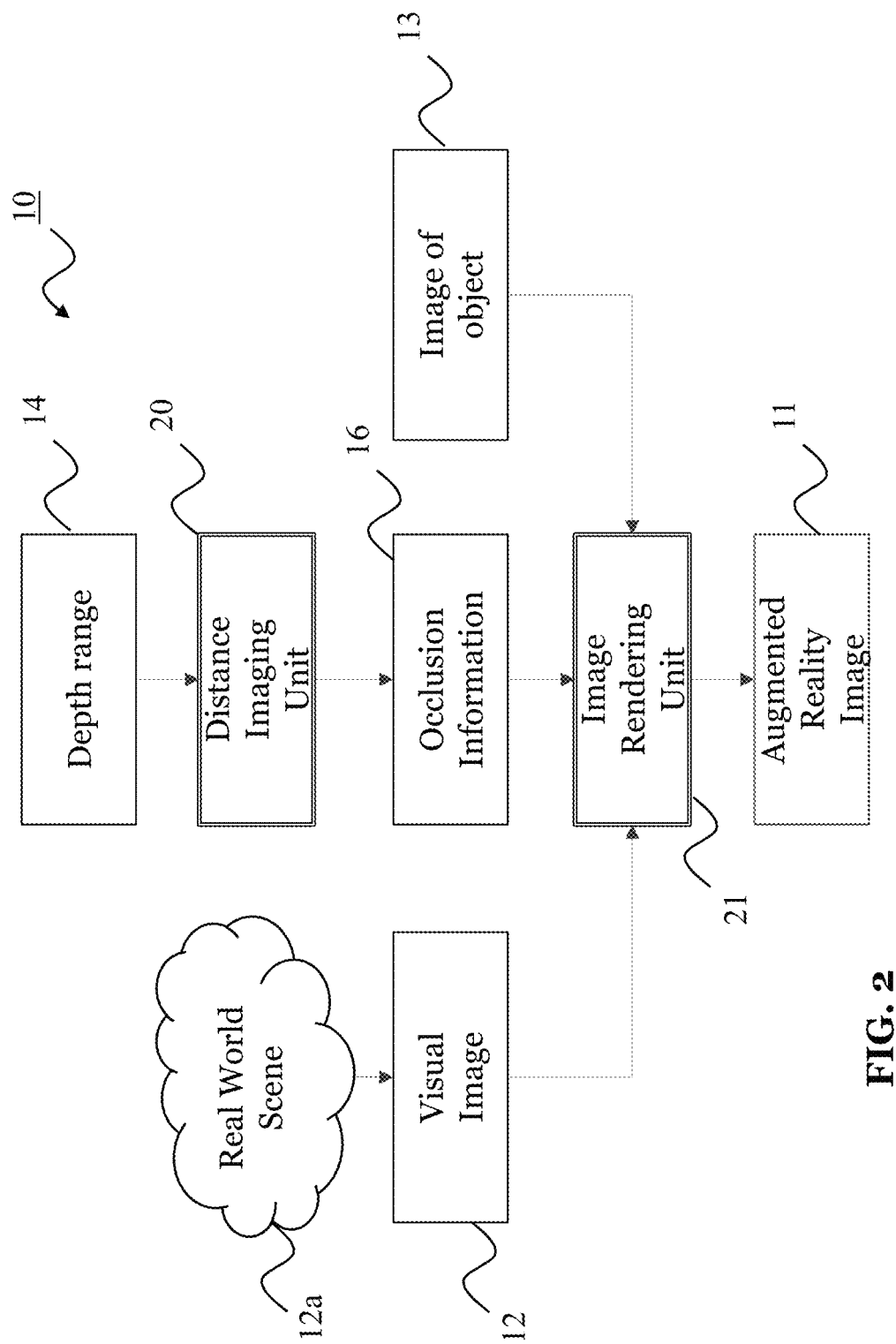
FIG. 2 shows a schematic of a device according to an embodiment of the disclosed technology.

FIG. 2 shows a schematic of the device 10, which builds on the device 10 shown in FIG. 1. Same elements in FIG. 1 and FIG. 2 share the same reference signs and function likewise.

As shown in FIG. 2, the device 10 may comprise a distance imaging unit 20, which is configured to image the real-world scene 12a according to the depth range 14, in order to determine the occlusion information. The device 10 may further comprise an image rendering unit 21, which is configured to generate the AR image 11 taking as an input: the first visual image 12 of the scene 12a, the image 13 of the graphical object 13a, and the occlusion information 16.

The distance imaging unit 20, in at least one embodiment, is a range gated imager. That means, the device 10 uses active illumination gated imaging to determine the third image 15, i.e., to determine which part of the scene 12 is in front of the depth range 14, and which part of the scene 12 is behind the depth range. This technique combines, or optionally may combine, a pulsed light source with a global shutter image sensor. By synchronizing the timing of the light pulse and the shutter, the image sensor can be made to have increased sensitivity to objects that are within a predetermined range of distances/depths from the distance imaging unit 20. For instance, it can be made to have increased sensitivity for objects within a distance of between 5.0 and 5.1 meters from the image sensor, or alternatively for objects that are within 5 meters distance from the image sensor. This technique may be based on the amount of time that a pulse of light needs to travel from the light emitter towards the object and back to the camera after reflecting off of the object. This technique is well known in literature and is generally referred to as Time-Of-Flight (TOF). TOF applied to active illumination gated imaging is referred to as range gated imaging.

The range of higher sensitivity is typically determined primarily by the width of the light pulse and the trigger signal and by the relative timing of light pulse and shutter. By comparing images recorded with and without active illumination (i.e., the first image 12 and the third image 15), the increased sensitivity of the sensor for objects within a specific depth range 14 allows the device 10 to obtain the occlusion information 16. The occlusion information 16 may identify parts of the image 12 that are within the depth range 14 and parts that are not.

Given the speed of light, the device 10 may be configured to control the light pulse, shutter, and relative timing between them at nanosecond time scales for reasonable levels of depth accuracy to be obtained, typically at least on the order of centimeters. Notably, active illumination gated image systems with such timing capabilities, resolution, and frame rate have been reported in literature.

For example, one or more of the components of the device 10 as shown in the schematic of FIG. 2 may be integrated with or coupled to ASIC. In some embodiments, the ASIC is applied or embodied in an AR device, such as an AR headset. In some embodiments, the ASIC comprises one or more processing components or is coupled to the ASIC to perform associated processing steps.

Figure 3:
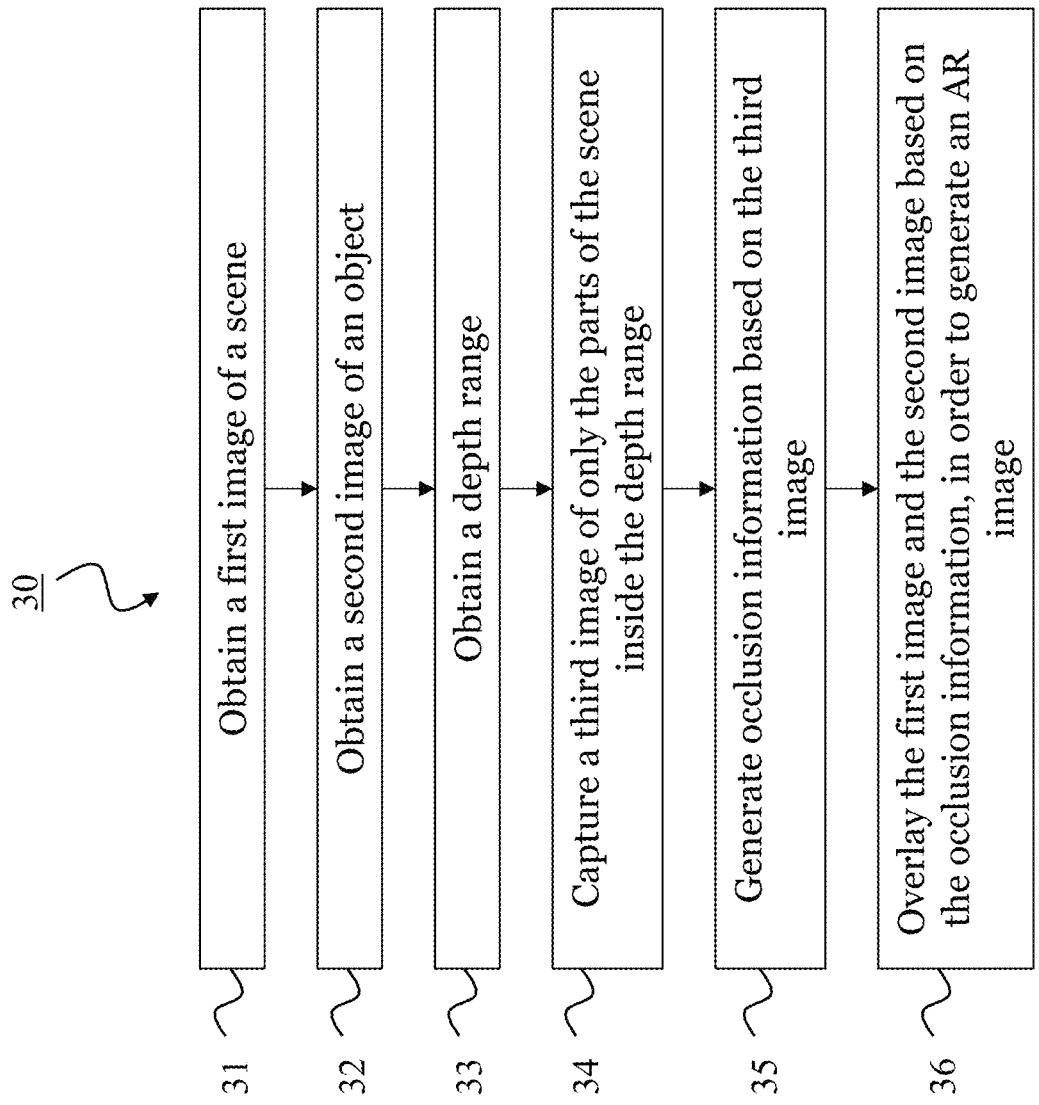
FIG. 3 shows a method according to an embodiment of the disclosed technology.

FIG. 3 shows a flow-diagram of a method 30 according to an embodiment of the disclosed technology. The method 30 of FIG. 3 can be carried out by the device 10, e.g., as shown in FIG. 1 or FIG. 2.

The method 30 comprises: a step 31 of obtaining a first image 12 of a scene 12a; a step 32 of obtaining a second image 13 of an object 13a; a step 33 of obtaining a depth range 14; and a step 34 of capturing a third image 15 of only the parts of the scene 12a inside the depth range 14. There is no particular order in which these steps have to be carried out.

The method further comprises: a step 35 of generating occlusion information 16 based on the third image 15; and a step 36 of overlaying the first image 12 and the second image 13 based on the occlusion information 16, in order to generate the AR image 11.

In summary, with the device 10 and method 30 according to embodiments of the disclosed technology, the occlusion of the object 13a can be determined from the occlusion information 16, e.g., from an occlusion map that describes parts of the first image 12 in front of and/or behind the obtained depth range 14. This allows for a high fidelity rendering of the occlusion needed for providing a realistic AR image 11. Since this task is not difficult to accomplish, the device 10 can perform at higher range, resolution, frame rate, and power efficiency. Further, the device 10 can be built in a compact manner and with low cost.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid-state storage devices, disk drives, etc.). The various functions disclosed herein may be embodied in such program instructions, or may be implemented in application-specific circuitry (e.g., application specific integrated circuits ("ASICs") or field programmable gate-arrays ("FPGAs")) of the computer system. For example, one or more of the components of the device 10 as shown in the schematic of FIG. 2 may be integrated with or coupled to ASIC. In some embodiments, the ASIC is applied or embodied in an AR device, such as an AR headset. In some embodiments, the ASIC comprises one or more processing components or is coupled to the ASIC to perform associated processing steps.

Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources multiple distinct business entities or other users share.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., random access memory ("RAM")) of a server or other computing device. A hardware-based computer processor of the computing device may then execute the executable instructions. In some embodiments, such processes or portions thereof may be implemented on multiple computing devices or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an ASIC, an FPGA or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few. The computer system and/or computing environment components described herein may be formed in or from a semiconductor material.

The elements of a method, process, routine, or algorithm described in connection with the embodiments disclosed herein can be embodied directly in hardware, in a software module executed by a processor device, or in a combination of the two. A software module can reside in RAM memory, flash memory, read only memory ("ROM") memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A device for generating an Augmented Reality, AR, image, the device configured to:
    obtain a first image of a scene;
    obtain a second image of a virtual object with respect to the scene, wherein the virtual object is to be added to the scene or to replace a portion of the scene;
    obtain a predetermined object depth range for placing the virtual object with respect to the scene in the AR image;
    capture a third image of only parts of the scene inside the predetermined object depth range;
    use the third image to determine a part of the scene that is in front of the virtual object and a part of the scene that is behind the virtual object;
    generate occlusion information which identifies pixels of the first image that are to be replaced by pixels of the second image and pixels of the second image that are to be replaced by pixels of the first image when overlaying the first image and the second image, based on the part of the scene that is in front of the virtual object and the part of the scene that is behind the virtual object that were determined by capturing the third image; and
    overlay the first image and the second image based on the occlusion information to generate the AR image by replacing the identified pixels of the first image by pixels of the second image and the identified pixels of the second image by pixels of the first image.

2. The device according to claim 1, further configured to:
    position the object of the second image in the scene of the first image to generate the AR image, wherein
    parts of the scene are occluded by the object and/or the object is occluded by parts of the scene, according to the occlusion information.

3. The device according to claim 1, wherein:
    the occlusion information identifies the parts of the first image that show the scene behind the predetermined object depth range, and the parts of the first image that show the scene in front of the predetermined object depth range.

4. The device according to claim 1, comprising:
    an imaging device configured to capture the first image and the second image,
    a range gated imager configured to capture the third image,
    a distance imaging unit configured to generate the occlusion information,
    an image rendering unit configured to overlay the first image and the second image based on the occlusion information to generate the AR image, and
    a display device configured to display the generated AR image.

5. The device according to claim 1, wherein the first image is one of a still image and a frame of a video and the AR image is one of an AR still image and an AR video, respectively.

6. The device according to claim 5, wherein the occlusion information provides information regarding occlusion relationships for the object of the second image and the scene of the first image and wherein the occlusion information is obtained based on a comparison of the first image and the third image.

7. An augmented reality (AR) headset comprising the device according to claim 1.

8. The device according to claim 1, wherein the device includes an application specific integrated circuit (ASIC).

9. The device according to claim 1, wherein the occlusion information is generated without reference to a full depth map.

10. The device according to claim 1, wherein the second image has a same resolution as the first image.

11. The device according to claim 1, wherein the second image has a same resolution as the first image, wherein pixels representing the object are marked "opaque" and pixels not representing the object are marked "transparent", and wherein the device is further configured to determine if pixels in the first image need to be rendered based on corresponding pixels in the second image being marked "transparent" or "opaque".

12. The device according to claim 1, wherein the device is further configured to determine if pixels in the first image need to be rendered based on whether they are in front of or behind corresponding pixels in the second image.

13. The device according to claim 1, wherein the second image comprises a reference frame and pixels that represent the object.

14. The device according to claim 1, wherein the first, second and third images do not include a depth information component.

15. A method for generating an Augmented Reality, AR, image, the method comprising:
  obtaining a first image of a scene;
  obtaining a second image of a virtual object with respect to the scene, wherein the virtual object is to be added to the scene or to replace a portion of the scene;
  obtaining a predetermined object depth range for placing the virtual object with respect to the scene in the AR image;
  capturing a third image of only the parts of the scene inside the predetermined object depth range;
  using the third image to determine a part of the scene that is in front of the virtual object and a part of the scene that is behind the virtual object;
  generating occlusion information which identifies pixels of the first image that are to be replaced by pixels of the second image and pixels of the second image that are to be replaced by pixels of the first image when overlaying the first image and the second image, based on the part of the scene that is in front of the virtual object and the part of the scene that is behind the virtual object that were determined by capturing the third image; and
  overlaying the first image and the second image based on the occlusion information, so as to generate the AR image by replacing the identified pixels of the first image by pixels of the second image and the identified pixels of the second image by pixels of the first image.

16. A non-transitory, computer readable medium comprising computer executable program code that, when implemented by a hardware processor of an imaging device, performs the method according to claim 15.

17. A method of generating an augmented reality (AR) image, the method comprising:
  capturing a first image of a scene with a first imaging device;
  obtaining a predetermined distance at which a virtual object with respect to the scene is to be placed in the image of the scene, wherein the virtual object is to be added to the scene or to replace a portion of the scene;
  capturing a second image of the scene with a second imaging device, wherein the second imaging device captures the second image with active illumination and with an increased sensitivity for objects in the scene at the predetermined distance;
  using the second image to determine a part of the scene that is in front of the virtual object and a part of the scene that is behind the virtual object;
  comparing the first image and the second image to identify occlusion information, which identifies pixels of the first image that are to be replaced by pixels of the virtual object and pixels of the virtual object that are to be replaced by pixels of the first image when overlaying the virtual object and the first image, based on which objects are determined to be within or outside of a specific distance range that includes the predetermined distance, as determined by capturing the second image; and
  overlaying the virtual object and the first image based on the identified occlusion information to generate the AR image by replacing the identified pixels of the first image by pixels of the second image and the identified pixels of the second image by pixels of the first image.

18. An augmented reality (AR) headset configured to perform the method of claim 17.

19. An application specific integrated circuit (ASIC) configured to perform the method of claim 17.

20. The method according to claim 17, wherein the occlusion information is identified without reference to a full depth map.

* * * * *